Jan. 30, 1934. M. GOBERT 1,945,367
PROCESS FOR THE SEPARATION OF GASEOUS MIXTURES
Filed June 13, 1932 2 Sheets-Sheet 1

Inventor
Maurice Gobert
By
Attorneys

Patented Jan. 30, 1934

1,945,367

UNITED STATES PATENT OFFICE 1,945,367

PROCESS FOR THE SEPARATION OF GASEOUS MIXTURES

Maurice Gobert, Chaville, France, assignor to L'Air Liquide, Societe Anonyme Pour L'Etude & L'Exploitation Des Procedes Georges Claude, Paris, France Application June 13, 1932, Serial No. 617,058, and in Germany June 13, 1931

13 Claims. (Cl. 183—115)

It is known that certain apparatus for the separation of gaseous mixtures such as air, which operate by liquefaction and rectification and give, in the case of air, oxygen on the one hand and nitrogen on the other, consist of a first rectifying column working under a certain pressure and a second rectifying column working under a lower pressure, the condenser at the top of the first column acting at the same time as vaporizer for the bottom part of the second column; for the sake of simplicity, the first column will hereinafter be termed the "high-pressure column" and the second column the "low-pressure column". However, in these two-stage rectifying apparatus, only two gases are liquefied and separated in the pure state and the object of the present invention is to indicate a process which, whilst using the aforesaid apparatus, enables a mixture of more than two gases to be separated into its constituents by liquefying them successively with the exception, if required, of the least liquefiable.

The invention consists in liquefying in the vaporizer-condenser at the top of the high-pressure rectifying column only a part of the gaseous mixture and in liquefying the remainder of this mixture in one or more additional condensers placed successively in liquids having successively decreasing temperatures, which liquids are located in the low-pressure rectifying column. In addition, the liquid obtained at the bottom of the high-pressure column is rectified in the low-pressure column by the part, which is not collected outside, of the gases vaporized by the vaporizer-condenser situated at the top of the high-pressure column, whilst the part of the liquid obtained in this condenser by the partial liquefaction under pressure is rectified by the gas which comes from the preceding rectification and to which is added the part, not collected outside, of the gas vaporized by the first additional condenser, the liquids formed in this condenser and in those which follow it being discharged at suitable places in the low-pressure column.

Figure 1:
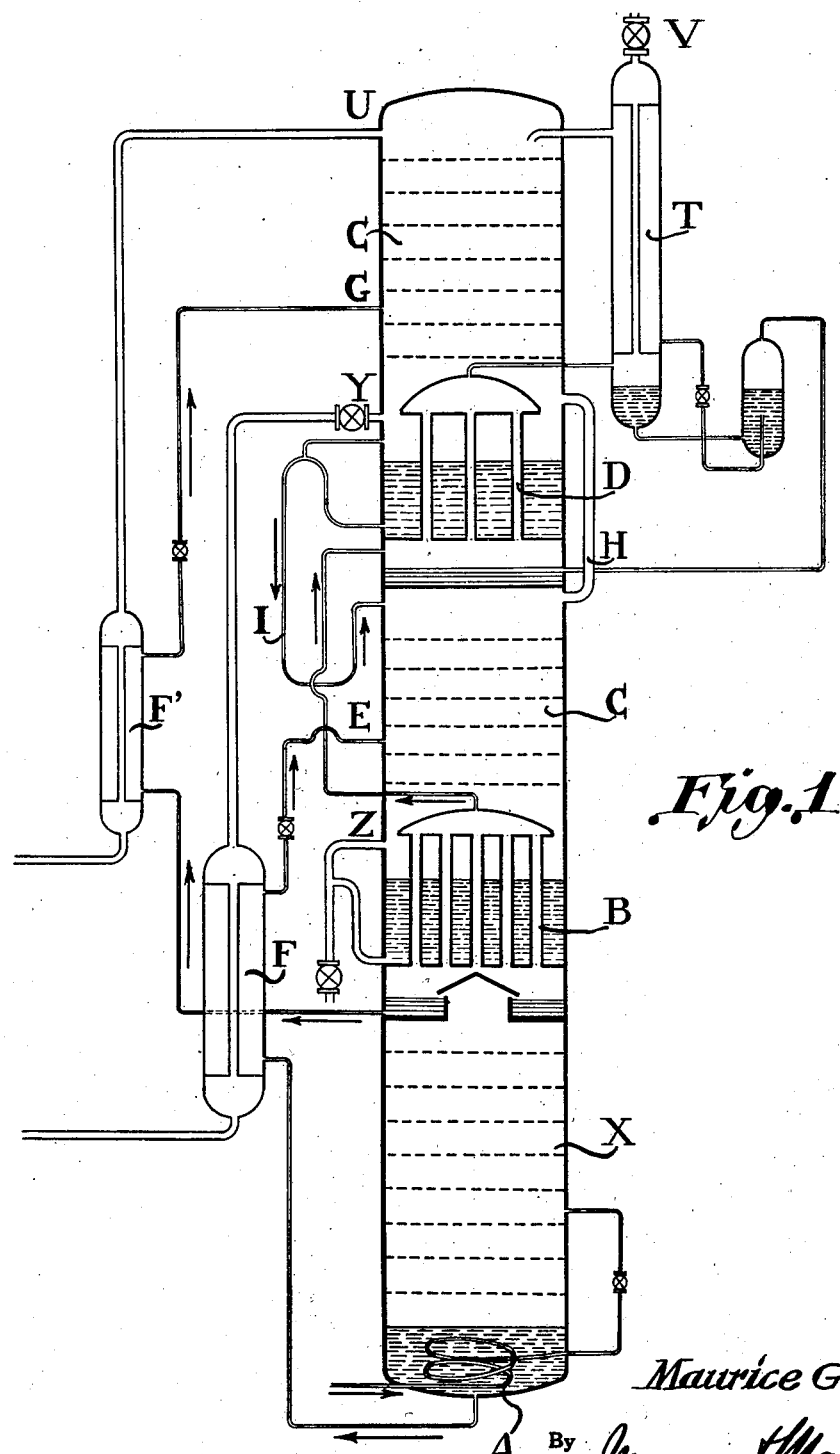
Figure 2:
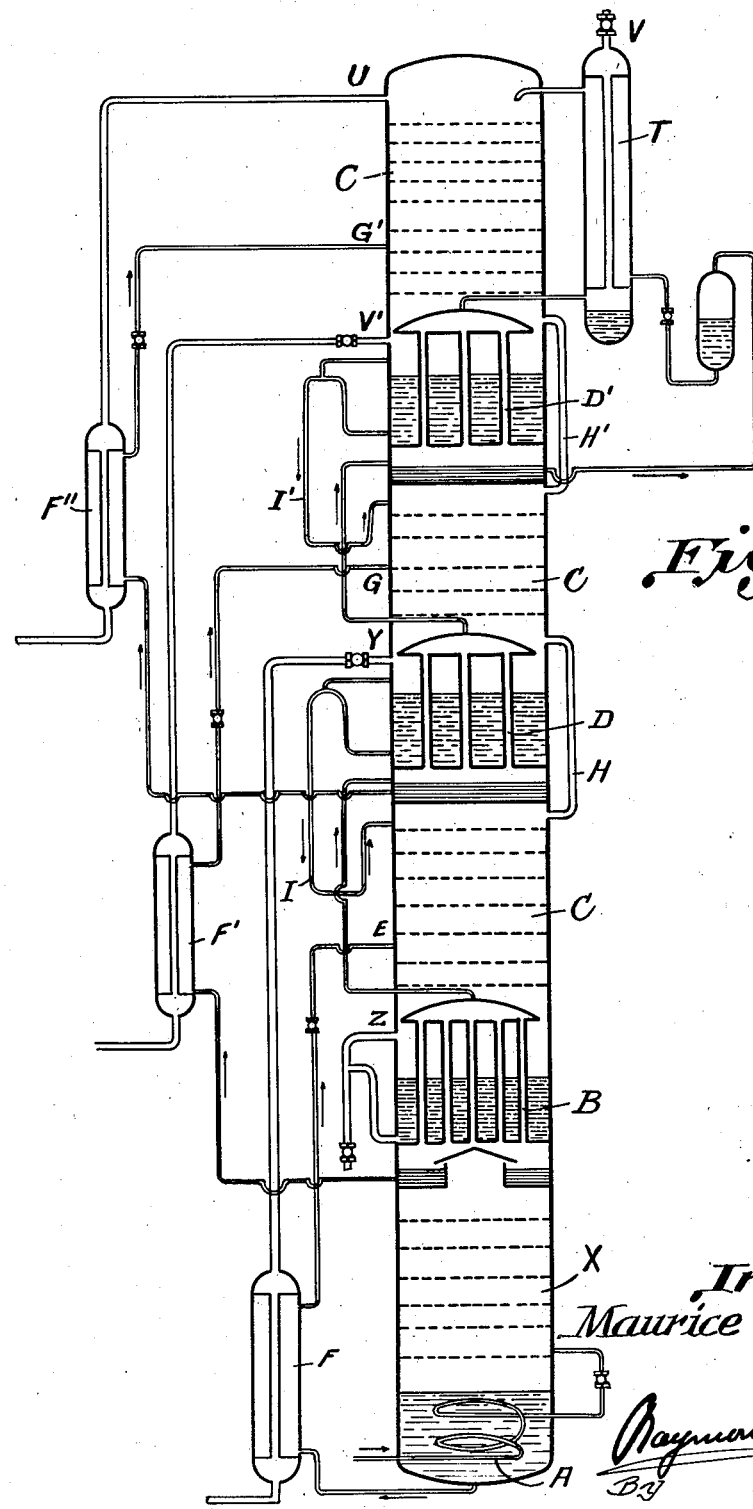

Figure 1 indicates one embodiment of the process. Figure 2 represents diagrammatically a second embodiment.

The accompanying Figure 1 represents diagrammatically and by way of example an embodiment of the present invention applied to the case in which the gaseous mixture contains four gases A', B', C' and D' which are consecutively increasingly difficult to liquefy, the last gas D' being very difficult to liquefy in relation to the three others.

The compressed gaseous mixture, previously purified and cooled by the usual devices, enters the high-pressure rectifying column X either in the gaseous state or in the partially liquid state if, as shown in the drawing, it has passed through a liquefying coil A. The gas or the mixture of liquid and gas is rectified in the said column X and the gas resulting therefrom in the upper part of the latter is liquefied partially in the vaporizer-condenser B at the top; the gas that remains after this liquefaction is sent, in order that it may be partially liquefied therein, into an additional condenser D placed inside the low-pressure column C which is working in the neighbourhood of the atmospheric pressure. The liquid, which is rich in the gaseous constituent A' and is obtained at the bottom of the high-pressure column X is introduced at E into the low-pressure column, after having, if necessary, been cooled in the exchanger F by the gas that is rich in the constituent B'. The liquid that is formed principally by the gaseous element B' condensed in the tubes of the vaporizer-condenser B, redescends in part into the high-pressure column and, in part is raised to G into the part of the low-pressure column that is above the additional condenser D, after, if necessary, having passed through an exchanger F' in which it is cooled by the gases leaving the top of the low-pressure column.

In the condenser D, it is principally the gaseous constituent C' which is liquefied and the latter is passed into the top of the low-pressure rectifying column after having, if necessary, cooled in the exchanger T the residual gas of the liquefaction in D; the latter gas is purified by the liquefaction in T and it leaves at V at the top of T in the condition of a gas consisting principally of the most volatile constituent D'. As shown by the figure, the liquid resulting from the purification of the residual gas performed in T may be added to the liquid condensed in the condenser D before the latter liquid is brought in indirect contact with the residual gas. The gases leaving at U at the top of the low-pressure column C consist principally of the gaseous constituent C'. The gas that is rich in the constituent B' passes out through Y above the liquid in the vaporizer D and the gas that is rich in the constituent A' passes out through Z which is above the liquid in the vaporizer B.

The tube H enables the gases of the low-pressure column, which are situated below the additional condenser D, to pass into the part above this condenser, in the same way as the tube I enables a part of the liquid that is outside the condenser D to pass down into the part of the rectifying column placed below the latter.

For an apparatus and a gas of a given composition, the size to be given to the surface of the different condensers, which is washed by liquid in the course of vaporization, is determined experimentally when first working the apparatus, so as to obtain the desired purities of all the separated constituents; for this purpose, the height of the liquid is suitably regulated. In this way, the magnitude of the liquefactions which are produced in the different condensers is increased at will and, by suitably distributing these surfaces among the different condensers, a more or less complete separation of the gases can be obtained, which will be better the more the boiling points of the liquefied products differ from each other.

Moreover, if desired, the purity of the product C' can be increased by subjecting this product that leaves at the top of the low-pressure column, to the known cycle of autopurification, in which it is compressed and then liquefied in, for example, the liquid around the additional condenser D, the liquid thus produced being introduced into the top of the low-pressure column which is suitably lengthened.

If necessary, the passages in which there is a risk of obstructions being formed, for example the parts of the pipes for raising liquid which follow the cocks fitted in these raising pipes, are provided with an outer jacket into which is passed a gas such as nitrogen or a part derived from the gaseous mixture treated, at a temperature which is sufficiently high to ensure the disappearance of the solids that would produce the obstruction.

The present process is applicable, inter alia, to the gaseous mixture containing ethylene which is obtained in the partial liquefaction of coke-oven gas for the manufacture of hydrogen or of mixtures of hydrogen and nitrogen.

In the apparatus in question, the coke-oven gas, after travelling through a first temperature exchanger in the opposite direction to the separated products, passes, for example from the top to the bottom, into a second exchanger working at temperatures of about —50° to —150° C. and there is collected at the bottom of this exchanger a liquid containing about 15% of ethylene which is rectified in the same apparatus in a rectifying column the bottom part of which is heated by a part derived from the coke-oven gas; this rectification removes the greater part of the more volatile products—namely, hydrogen, nitrogen and methane. The liquid collected in the vaporizer of the rectifying column contains about 50% of ethylene, 30% of methane, 10% of heavy hydrocarbons such as propylene, pentane, etc. and 10% of hydrogen, nitrogen and methane, and this liquid is vaporized in a special compartment of the first temperature exchanger. It is the gas thus obtained that can be treated by the process of the present invention, unless it is preferred to treat, in the proper apparatus for the manufacture of hydrogen and by the present process, the ethyleic liquid collected at the bottom of the aforesaid vaporizer.

In any case there are collected a mixture of hydrogen, nitrogen and methane at V, a gas rich in ethylene at U, a gas containing a rather large proportion of ethane at Y and a gas rich in heavy hydrocarbons at Z.

Figure 2 illustrates an embodiment of the invention in which two condensers-vaporizers are located within the low-pressure rectifying column C. The liquid formed within the condenser-vaporizer D instead of being passed to the top of the column C, either directly or through the liquefier T, is delivered at G' between the condenser-vaporizer D' and the top of the column C, and it is the liquid formed within the latter condenser-vaporizer which is passed, through the condenser T, to the top of the rectifying column C. An additional constituent is thus withdrawn at Y' from the column C, so that a five constituent gaseous mixture may be separated into its constituents.

Moreover the number of condensers-vaporizers located within the low-pressure column C is not limited and may be increased at will, the liquid formed in each of them being delivered, after its pressure has been relieved, above the condenser-vaporizer, in which it has been formed, but below the immediately higher condenser-vaporizer, and the liquid formed in the highest condenser-vaporizer being delivered to the top of the column C. Mixtures of more than five constituents may thus be separated into their various constituents.

What I claim is:

1. The process for the separation of gaseous mixtures containing more than two constituents by liquefaction and rectification successively performed under a higher and a lower pressure which comprises; subjecting the gaseous mixture to a rectification under the higher pressure, whereby a first liquid and a gas under the higher pressure are obtained; partially condensing said gas under the higher pressure to a second liquid; utilizing a portion of said second liquid as rectifying liquid for the treated gaseous mixture under the higher pressure; relieving the pressure of the remaining portion of said second liquid; and heating the whole of the remaining portion of said second liquid by the gas under the higher pressure from which the second liquid has been condensed, whereby a third liquid condenses from said gas under a higher pressure and gas vaporizes from said remaining portion of the second liquid.

2. The process for the separation of gaseous mixtures containing more than two constituents by liquefaction and rectification successively performed under a higher and a lower pressure which comprises; subjecting the gaseous mixture to a rectification under the higher pressure, whereby a first liquid and a gas under the higher pressure are obtained; partially condensing said gas under the higher pressure to a second liquid; utilizing a portion of said second liquid as rectifying liquid for the treated gaseous mixture under the higher pressure; relieving the pressure of the remaining portion of said second liquid; heating the remaining portion of said second liquid by the gas under the higher pressure from which the second liquid has been condensed, whereby a third liquid condenses from said gas under a higher pressure and said remaining portion of the second liquid partially vaporizes; and utilizing the non-vaporized part of said remaining portion of the second liquid as a cooling medium whose vaporization brings about the partial condensation of the gas under the higher pressure resulting from the rectification of the gaseous mixture under the higher pressure.

3. A process as in claim 1 in which the portion of the second liquid which is heated by the gas under the higher pressure is rectified by a part of the gas vaporized from said portion before being heated by the gas under the higher pressure, the remaining part of the vaporized gas being collected.

4. A process as in claim 2 in which the portion of the second liquid which is heated by the gas under the higher pressure is rectified by a part of the gas vaporized from said portion before being heated by the gas under the higher pressure, the remaining part of the vaporized gas being collected.

5. The process for the separation of gaseous mixtures containing more than two constituents by liquefaction and rectification successively performed under a higher and a lower pressure which comprises: subjecting the gaseous mixture to a rectification under the higher pressure, whereby a first liquid and a gas under the higher pressure are obtained; partially condensing said gas under the higher pressure to a second liquid; utilizing a portion of said second liquid as rectifying liquid for the treated gaseous mixture under the higher pressure; relieving the pressure of the remaining portion of said second liquid; heating the remaining portion of said second liquid by the gas under the higher pressure from which the second liquid has been condensed, whereby a third liquid condenses from said gas under a higher pressure and gas vaporizes from said remaining portion of the second liquid; and rectifying a part of said vaporized gas by said third liquid, the remaining part being collected.

6. The process for the separation of gaseous mixtures containing more than two constituents by liquefaction and rectification successively performed under a higher and a lower pressure which comprises; subjecting the gaseous mixture to a rectification under the higher pressure, whereby a first liquid and a gas under the higher pressure are obtained; partially condensing said gas under the higher pressure to a second liquid; utilizing a portion of said second liquid as rectifying liquid for the treated gaseous mixture under the higher pressure; relieving the pressure of the remaining portion of said second liquid; and heating the remaining part of said second liquid by the gas under the higher pressure from which the second liquid has been condensed, whereby said gas under the higher pressure partially condenses to a third liquid and gas vaporizes from said remaining portion of the second liquid; relieving the pressure of said third liquid; and heating said third liquid by the gas under the higher pressure from which the third liquid has been condensed, whereby a fourth liquid condenses from said gas under the higher pressure and gas vaporizes from said third liquid.

7. A process as in claim 6, in which the fourth liquid is admixed with the third liquid, before said third liquid is heated by the gas under the higher pressure.

8. The process for the separation of gaseous mixtures containing more than two constituents by liquefaction and rectification successively performed under a higher and a lower pressure which comprises; subjecting the gaseous mixture to a rectification under the higher pressure, whereby a first liquid and a gas under the higher pressure are obtained; rectifying said first liquid under the lower pressure by circulating it downwardly and further heating it by said gas under the higher pressure, whereby said gas under the higher pressure partially condenses to a second liquid, and a gas under the lower pressure vaporizes from the first liquid; utilizing a portion of the second liquid as rectifying liquid for the treated gaseous mixture under the higher pressure; collecting a portion of the gas under the lower pressure resulting from the vaporization of the first liquid; relieving the pressure of the remaining portion of the second liquid; heating said remaining portion of the second liquid by the gas under the higher pressure from which the second liquid has been condensed, whereby a third liquid condenses from said gas under the higher pressure and a part of said remaining portion of the second liquid is vaporized; and rectifying the non-collected portion of the gas under the lower pressure resulting from the vaporization of the first liquid, after said non-collected portion has been rectified by the first liquid, by the non-vaporized part of the remaining portion of the second liquid.

9. A process as in claim 8 in which the portion of the second liquid which is heated by the gas under the higher pressure is rectified by a part of the gas vaporized from said portion before being heated by the gas under the higher pressure, the remaining part of the vaporized gas being collected.

10. The process for the separation of gaseous mixtures containing more than two constituents by liquefaction and rectification successively performed under a higher and a lower pressure which comprises; subjecting the gaseous mixture to a rectification under the higher pressure, whereby a first liquid and a gas under the higher pressure are obtained; rectifying said first liquid under the lower pressure by circulating it downwardly and further heating it by said gas under the higher pressure, whereby said gas under the higher pressure partially condenses to a second liquid, and a gas under the lower pressure vaporizes from the first liquid; utilizing a portion of the second liquid as rectifying liquid for the treated gaseous mixture under the higher pressure; collecting a portion of the gas under the lower pressure resulting from the vaporization of the first liquid; rectifying the remaining portion of the gas under the lower pressure, after it has been rectified by the first liquid, by the remaining portion of the second liquid, while causing said remaining portion of the second liquid to form a bath on its way down to the first liquid; heating said bath by the gas under the higher pressure, from which the second liquid has been condensed, whereby a third liquid condenses from said gas under the higher pressure and a part of the liquid of the bath is vaporized; collecting a portion of the gas arising above said bath; and rectifying the non-collected portion, after it has been rectified by the second liquid, by the third liquid.

11. A process as in claim 10 in which; the heating of the bath of the second liquid by the gas under the higher pressure brings about the liquefaction of only a part of said gas under the higher pressure; the third liquid is caused to form a bath on its way down to the second liquid; said bath of the third liquid is heated by the gas under the higher pressure from which the third liquid has been condensed, whereby a fourth liquid condenses from said gas under the higher pressure and a part of the third liquid of the bath is vaporized; a portion of the gas arising above said bath of the third liquid is collected; and the non-collected portion, after it has been rectified by the third liquid, is rectified by the fourth liquid.

12. A process as in claim 10 in which the bath formed by the second liquid is by-passed by the gas under the lower pressure.

13. A process as in claim 10 in which; the heating of the bath of the second liquid by the gas under the higher pressure brings about the liquefaction of only a part of said gas under the higher pressure; the third liquid, before it is utilized for the rectification of the gas under the lower pressure, is circulated in heat exchange with the gas under the higher pressure from which the third liquid has been condensed, whereby a fourth liquid condenses from the gas under the higher pressure; and said fourth liquid is added to the third liquid before said third liquid is circulated in heat exchange with the gas under the higher pressure.

MAURICE GOBERT.